R. T. ANDERSON.
OVERTIME CHART.
APPLICATION FILED MAY 2, 1921.
1,400,652.
Patented Dec. 20, 1921.
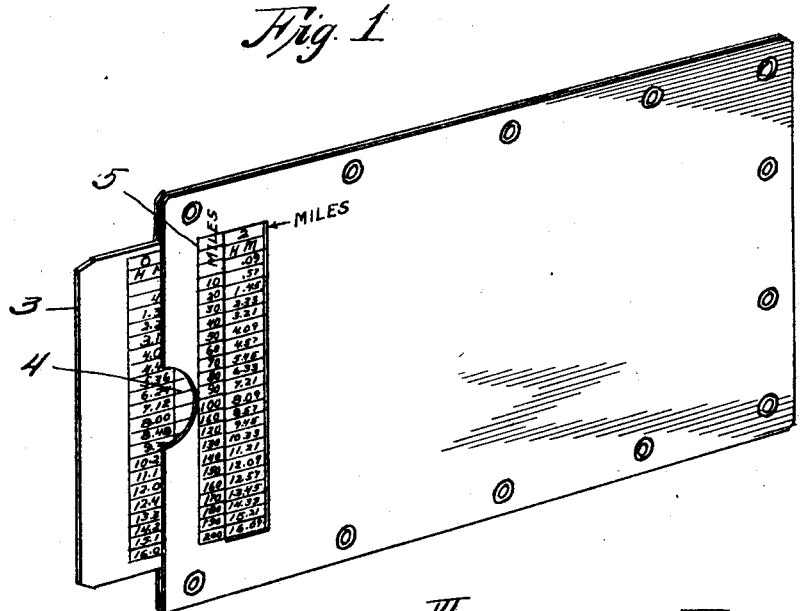
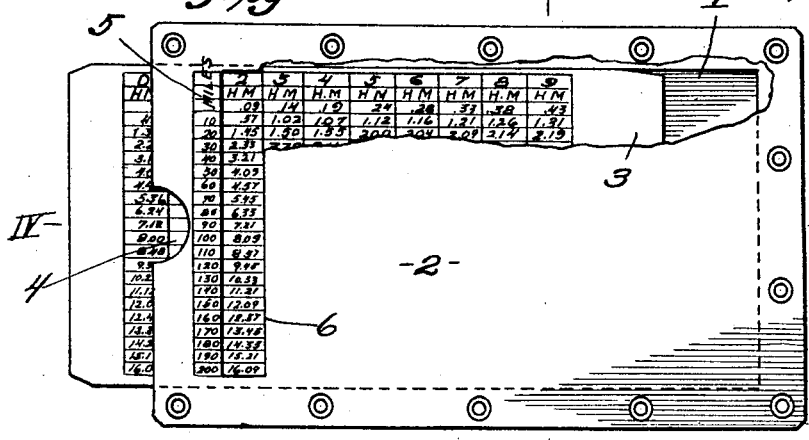
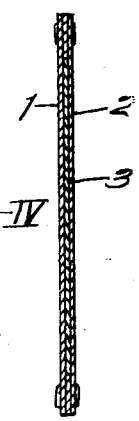
Inventor
R. T. Anderson

UNITED STATES PATENT OFFICE.

RAYMOND T. ANDERSON, OF DODGE CITY, KANSAS, ASSIGNOR OF ONE-HALF TO W. W. SMITH, OF DODGE CITY, KANSAS.

OVERTIME-CHART.

1,400,652.	Specification of Letters Patent.	Patented Dec. 20, 1921.

Application filed May 2, 1921. Serial No. 466,114.

*To all whom it may concern:*

Be it known that I, RAYMOND T. ANDERSON, a citizen of the United States, and resident of Dodge City, Ford county, Kansas, have invented a certain new and useful Improvement in Overtime-Charts, of which the following is a complete specification.

This invention relates to overtime charts, and is more particularly adapted for the use of trainmen to enable them to quickly and accurately determine the amount of pay due them at the end of a particular run. In freight service, the trains are expected to travel at a speed of twelve and one-half miles per hour and a shift covers a period of eight hours, and upon these units the chart is based.

More specifically the object is to produce a chart for use when the employee has been on duty for a longer period of time than would have normally been consumed in making a particular run, as in such cases he is entitled to overtime for the difference between such normal period and the period of time actually consumed by the run.

With the above-named objects in view, the invention consists in certain novel and useful features of construction as hereinafter described and claimed; and in order that it may be fully understood, reference is to be had to the accompanying drawing, in which:

Figure 1 is a perspective view of the chart in operative position.

Fig. 2 is a plan view of the device, partly broken away to more clearly illustrate the invention.

Fig. 3 is a section on the line III—III of Fig. 2.

Fig. 4 is a section on the line IV—IV of Fig. 2.

In the said drawing, where like reference characters identify corresponding parts in all of the figures 1 is a back piece, and 2 a face piece riveted or otherwise secured to the back piece in such a manner as to be closed at the sides and at one end, and to slidably receive a chart member 3, the back and face pieces at the open end, being provided with a recess 4 in order that the sliding member may be easily grasped for operation.

Near one margin of the face piece, a vertical column of mile indicating numbers 5 are placed, and adjacent such column of figures, said face piece is provided with a vertically-elongated opening 6, in order that the indicating matter appearing on the sliding chart, may be visible therethrough.

In the chart as shown in the invention, it will be noted that the column of figures on the face piece, is used to indicate miles traveled, and increases at the rate of ten miles, from 10 to 200, and that on the sliding chart beginning at the left there is a horizontal row of mile-indicating figures, from 0 to 9. It will thus be apparent that in order to read 12 miles for example, on the chart, one must read the 10 appearing on the face plate in connection with the 2 appearing at the top of the third indicating column of the sliding chart.

Immediately underlying said row figure are the symbols H. M., representative of hours and minutes, the remaining figures on the card being arranged in vertical aline with the figures 0 to 9 inclusive. Such vertical columns of figures are respectively headed by figures beginning under column No. "1", as follows: four minutes (.04), nine minutes (.09), fourteen minutes (.14), nineteen minutes (.19), twenty four minutes (.24), twenty eight minutes (.28), thirty three minutes (.33), thirty eight minutes (.38), and forty three minutes (.43). In the second horizontal row the figure .48 (indicating forty eight minutes) occupies the horizontal plane of the mile-indicating figure No. "10" on the face piece.

In the same vertical columns as the figures 0 to 9 inclusive, and running downward and spaced correspondingly to the figures 10 to 200 inclusive, are figures representative of the time a train should consume in traveling the distances represented by said miles column of figures on the face piece taken together with the mile horizontal row of figures appearing on the sliding member. For example, a train running at twelve and one-half miles per hour, the basis of the chart and the average speed of freight trains, should run fifty two miles (see the 50 on the face piece plus the 2 of the sliding member) in four hours and nine minutes, or should run two hundred and two miles in sixteen hours and nine minutes (see Fig. 1).

It will be understood that the standard working period for employees in railroad freight service is 8 hours, as hereinbefore stated, and that the rate of pay is calculated in conjunction with the distance run by the train in that period of time, the average running speed being twelve and one-half miles per hour, and this rate is used in figuring the over-pay due the employee. For example, the train on which an employee works as a member of the crew, covers a distance of 110 miles in 10 hours and 33 minutes. The employee in order to determine how his pay should be calculated will immediately refer to his chart and will find that the average time for such a distance is 8 hours and 48 minutes, but that the distance his train should have covered in the time taken, 10 hours and 33 minutes, is 132 miles, and that, therefore, the distance twenty-two miles should be used as the basis in calculating his over time pay. If the employee is entitled to pay for overtime in the example set forth, it will be seen that he is entitled to overtime pay of 1 hour and 45 minutes, the time which his train should take in running twenty-two miles.

By reference to the drawing it will be noted that the chart illustrated is limited in range of miles from 1 to 209 miles, but it will be readily understood that the scope unlimited in this regard, as with a larger chart a greater range of mileage could be set forth. It will also be understood that the device of the invention can be adapted to other uses requiring a chart for use in computing proportional values of related character.

I claim:

1. A chart comprising a member having a vertical column of figures beginning with ten and increasing by tens, and a second member adjustable laterally with respect to said column of figures; said second member having a horizontal row of figures running from 0 to 9 inclusive, and vertical underlying columns of figures representing hours and minutes which a train is expected to consume in travel at a certain speed with respect to the miles column of figures on the first-named member and the figures of such column plus any of the figures of the horizontal row on the said second member.

2. A chart comprising a member having a vertical column of figures beginning with ten and increasing by tens, and a second member adjustable laterally with respect to said column of figures; said second member having a horizontal row of figures running from 0 to 9 inclusive, and vertical underlying columns of figures representing hours and minutes which a train is expected to consume in travel at a certain speed with respect to the miles column of figures on the first-named member and the figures of such column plus any of the figures of the horizontal row on the said second member, and a slot in said first-named member to expose any particular row of the vertical columns of figures on the second-named member.

3. A chart comprising a member having a vertical column of figures beginning with ten and increasing by tens, and a second member adjustable laterally with respect to said column of figures; said second member having a horizontal row of figures running from 0 to 9 inclusive, a second row of horizontal hours and minutes indicating marks underlying said row of figures, and vertical underlying columns of figures representing hours and minutes which a train is expected to consume in travel at a certain speed with respect to the miles column of figures on the first-named member and the figures of such column plus any of the figures of the horizontal row on said second member, and a slot in said first-named member to expose any particular row of the vertical columns of figures on the second-named member.

4. A chart comprising a member having a vertical column of figures beginning with ten and increasing by tens and forming a pocket provided with a recess, and a second member slidably engaging said pocket and operable from said recess; said second member having a horizontal row of figures running from 0 to 9 inclusive, and vertical underlying columns of figures representing hours and minutes which a train is expected to consume in travel at a certain speed with respect to the miles column of figures on the first-named member and the figures of such column plus any of the figures of the horizontal row of said second member.

In witness whereof I hereunto affix my signature.

RAYMOND T. ANDERSON.